United States Patent [19]

Bardon et al.

[11] Patent Number: 4,905,304
[45] Date of Patent: Feb. 27, 1990

[54] MOBILE RADIO FACILITY

[75] Inventors: Hermann Bardon; Ernst Macher, both of Nuremberg, Fed. Rep. of Germany

[73] Assignee: U.S. Philips Corporation, New York, N.Y.

[21] Appl. No.: 210,267

[22] Filed: Jun. 23, 1988

[30] Foreign Application Priority Data

Jul. 2, 1987 [DE] Fed. Rep. of Germany ....... 3721806

[51] Int. Cl.$^4$ .............................................. H04B 1/06
[52] U.S. Cl. ...................................... 455/89; 455/345
[58] Field of Search ................... 455/89, 90, 345, 346, 455/348, 349, 4–7; 310/825.5

[56] References Cited

U.S. PATENT DOCUMENTS

| 4,232,390 | 11/1980 | McEvilly, Jr. ................. 455/89 |
| 4,531,232 | 7/1985 | Sakurai .......................... 455/345 |
| 4,602,358 | 7/1986 | Sato ............................... 455/345 |
| 4,776,553 | 10/1988 | Kobayashi ..................... 455/90 |

FOREIGN PATENT DOCUMENTS 2618701 11/1977 Fed. Rep. of Germany ........ 455/89
0018525 4/1980 Fed. Rep. of Germany .
62-78922 4/1987 Japan .

OTHER PUBLICATIONS

"Detachable Mobile Radio Unit for Automobile Telephone System", by Tsujimura, Japan Telecom. Review, Oct. 1985, pp. 245–249.

Primary Examiner—Robert L. Griffin
Assistant Examiner—Curtis Kuntz
Attorney, Agent, or Firm—Algy Tamoshunas; Leroy Eason

[57] ABSTRACT

A mobile radio facility for installation in a motor vehicle which already includes a junction cable extending from a location in the trunk to a location in the passenger compartment, terminating at each end in a plug connector. The facility includes a radio unit which can be installed in the trunk and plug connected to the vehicular cable, and one or more peripheral units in the passenger compartment such as a micro-telephone, control panel and/or portable telephone. Each peripheral unit has at least a pair of identical plug-in terminals providing identical connections thereto. The facility also includes a plurality of additional junction cables, one of which is plug-connected at one end to the vehicular cable and at the other end to a plug-in terminal of one of the peripheral units. Each of the remaining cables is plug-connected at each end to a plug-in terminal of different peripheral units so as to establish a sequential order of interconnection of all such units to the vehicular cable. This permits selection of an optimum interconnection sequence for any combination of peripheral equipments included in the mobile radio facility.

5 Claims, 1 Drawing Sheet

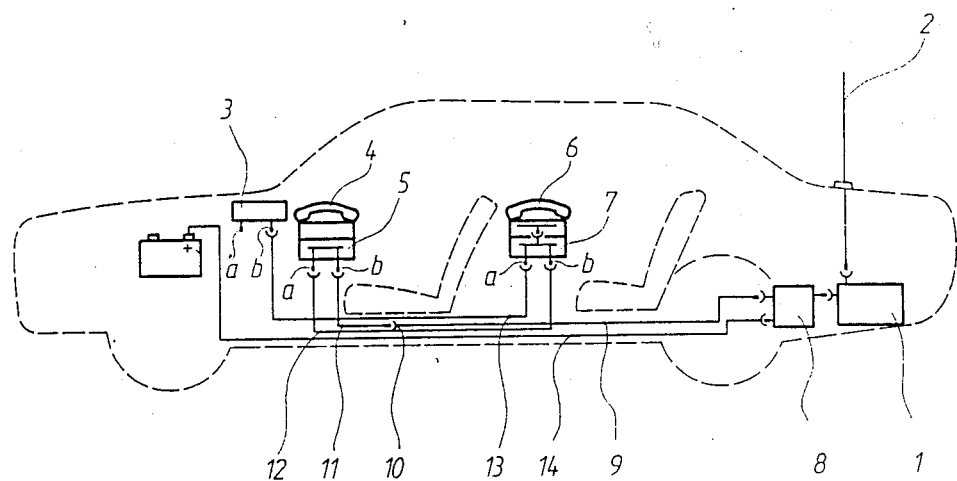

MOBILE RADIO FACILITY

BACKGROUND OF THE INVENTION

1. Field of the Invention

The invention relates to a mobile radio facility, especially a car telephone facility, in which the radio section and further facility components, such as a micro-telephone, control panel and/or portable telephone are arranged spatially separated and are interconnected through junction cables, a cradle being provided for holding the micro-telephone or portable telephone, respectively.

2. Description of Related Art

The main components of a mobile radio facility built-in in a motor car, and especially a car telephone facility, are a radio section, an aerial, a control panel and a micro-telephone. For holding the micro-telephone in the motor car a cradle is provided, the micro-telephone being connected through a cable to the cradle and the latter through a further cable joint to the radio section. The connecting cable to the micro-telephone is usually an elastic coiled cord. The micro-telephone and the control panel can be combined into one portable telephone if the keys and display of the control panel are mounted at the back of the portable telephone.

If the mobile radio facility built-in in a motor car comprises a portable telephone, a cable joint is required between the portable telephone cradle and a radio section which is usually mounted in the trunk of a private car. This cable can be plugged into the radio section and the cradle and has therefore wiring connectors on either end.

If in its stead a facility with a control panel separated from a micro-telephone is chosen, a cable joint can be employed leading from the radio section to the micro-telephone or its cradle, respectively, and also to the control panel. This can be effected such that the cable connected to the radio section divides by way of a wiring connector into two cords inside the passenger compartment, one of these two cords being connected by means of a wiring connector to, for example, the telephone cradle mounted on the console between the front seats of the car, and the second cord being connected by means of another connector to the control panel installed in the instrument panel of the private car.

As basic equipment of a motor car adapted to have a car telephone facility built-in at a later date, a cable is provided between the location of a radio section in the trunk and the passenger compartment of the vehicle. The end of the cable in the passenger compartment can then be plugged into the cradle for a portable telephone or ends in an adaptor for a micro-telephone. To this adaptor a first cable can be connected which is linked with the cradle for the micro-telephone and which contains the small number of lines required for the functions of the micro-telephone. A further cable connected to this adaptor contains the leads required for the function of the control panel and is provided with a corresponding multi-pin plug, connecting it to the control panel. However, problems arise when other variants of the equipment are desired or subsequent conversions have to be realized, for example a second subsriber's station in addition to the first subsriber's station in the rear of the car, which in that case requires yet another control panel, or additional equipment with a portable telephone in the rear of the car. The following versions are conceivable:

1. Radio section with one portable radio
2. Radio section with two portable radios
3. Radio section with a control panel and a micro-telephone
4. Radio section with control panel and two micro-telephones
5. Radio section with control panel and micro-telephone and an additional portable telephone
6. Radio facility with two control panels and two micro-telephones

SUMMARY OF THE INVENTION

The invention utilizes the vehicle junction cable which is typically provided between the position of a radio section to be installed in the trunk and a suitable position in the passenger compartment of a vehicle, such cable already being provided as basic equipment of the vehicle and having plug-in wiring connectors at either end. The object of the invention is to arrange the mobile radio facility, especially a car telephone facility of the type mentioned in the preamble, such that without additional changes to the vehicle cable already available as basic equipment, the vehicle can be provided in the most simple and cost-effective way with any combination of mobile radio equipment desired by the client as well as any additions or subsequent conversion to a different variant of such equipment.

According to the invention this object is achieved in that the radio section is connected to a part of the mobile radio facility, and can be connected to any further parts of the facility without requiring a specific sequential order of such connections. This achieves that the cable leading from the radio section to the passenger compartment of the vehicle can be connected, for example, to a control panel and the latter to a telephone cradle, or can be connected to a telephone cradle and the latter to the control panel. This is especially advantageous in that for each junction cable, depending on the construction features of the motor car, the most optimum sequence of connections can always be chosen.

In an advantageous embodiment of the invention the telephone cradle and the control panel have identical and correspondingly switched wiring terminals and such wiring terminals are available in pairs.

BRIEF DESCRIPTION OF THE DRAWING

Hereinafter, the invention will be further explained with reference to an exemplary embodiment depicted in the sole FIGURE.

DESCRIPTION OF THE PREFERRED EMBODIMENTS

The FIGURE shows in a dashed line the outline of a motor car in which a mobile radio facility is built in, which essentially consists of a radio section 1 in the trunk, an aerial 2 connected thereto and further facility components. They are a control panel 3 and a micro-telephone 4 with an associated telephone cradle 5, as well as a portable telephone 6 with associated cradle 7. A junction cable 9 is connected to the radio facility 1 through an adaptor 8, which cable is already provided as basic equipment in the motor car when it is manufactured. It ends in a wiring connector 10 at a suitable easily accessible place in the passenger compartment of the motor car, in this case on the console within reach between the front seats.

The aerial 2 for the mobile radio facility is fixed to the rear of the car and connected directly to the radio section 1. Cable 14 which is connected to adaptor 8 is provided between the battery in the engine compartment and the radio section to supply the power to the mobile radio facility. The connection between the adaptor 8 and the radio section 1 is realized through a single multi-pin wiring connector. It not only incorporate; the connections to the control panel and to the micro-telephone, but also to the power supply line. This arrangement renders it possible by detaching only two electrical wiring connectors and one quick-action device to remove the radio section from vehicle and prepare same for conversion to the use as a portable facility.

In a further variant of arrangement of radio section, without using an adaptor the junction cable 9 as well as the power supply line 14 can be directly plugged into the radio section.

A cable 11 is connected to the wiring connector 10 of the vehicle junction cable 9 leading to the radio section 1 and at the other end is plugged into the wiring terminal b of the cradle 5 of the micro-telephone 4. The cradle 5 in the exemplary embodiment is arranged between the front seats of the motor-car. All connections of the wiring terminal b are also present on the wiring terminal a of the cradle 5, so that it is unimportant whether the junction cable 11 is plugged onto wiring terminal a or wiring terminal b. In the exemplary embodiment a further junction cable 12 leading to the cradle 7 for the portable telephone 6, which is installed in the rear of the motor car, is connected at one end to the wiring terminal b of cradle 7 and is connected at the other end to the wiring terminal a of cradle 5. The cradle 7 also is equipped with a further wiring terminal a which is identical with wiring terminal b and has the same electrical wiring. This wiring terminal a is connected via the the junction cable 13 to the control panel 3 in the instrument panel of the motor car. The wiring terminal b of control panel 3 is used, but wiring terminal a, which is identical with wiring terminal b and has the same electrical wiring, could instead be used.

Instead of the lay-out of the junction cables chosen in the exemplary embodiment, the vehicle junction cable coming from the radio section 1 could be connected to a wiring terminal of control panel 3 via a junction, and the control panel could be connected via its second wiring terminal and a further junction cable to the cradle 5 for micro-telephone 4. Then, the cradle 5 could be connected via a third junction cable to the cradle 7 of the portable telephone in the rear of the motor-car.

Thus, as stated hereinbefore, always the most advantageous sequence of connections of the cables can be chosen in dependence on the constructive features of the motor car and it is possible in a simple way to accomodate additional equipment and conversions. If, for example, the arrangement shown in the FIGURE initially comprised only the control panel 3 and the cradle 5 for the micro-telephone 4, only one additional junction cable besides vehicle cable 9 would have to be provided to connect the control panel to the portable telephone 6 and the associate cradle 7. Such additional junction cable could be connected to the respective second wiring terminal either of the control panel 3 or of the cradle 5 for the micro-telephone 4.

An especially advantageous embodiment is realized if very small types of wiring connectors are chosen for the cables, so that the subsequent laying out of junction cables under covers and, for example, under the carpet and through openings in components of the carriage of the passenger compartment is facilitated. The cable 11, which forms the connection with vehicle junction cable 9 leading to the radio section 1, can then be provided with a wiring connector at one end which can be fitted onto the serial-type plug 10 on junction cable 9.

The telephone-set ends of the wiring terminals a and b can be soldered onto a printed circuit board; the interconnection of the pins as well as the leads extending to the sets being printed lines on the printed circuit board. Therefore, the arrangement can be produced in a simple and cost-effective manner, the required wiring terminals being obtainable as inexpensive components.

The cradle 7 for the portable telephone 6 in the embodiment has an adaptor facility, which is represented in the schematic diagram by an adaptor. In this case it will suffice to connect the wiring terminals which are available in pairs to the adaptor facility. The cradle itself is fixed to the adaptor facility by means of associated mechanical bracket means and electrically connected to the adaptor facility by means of a wiring connector. Consequently, it is possible for the portable telephone, which also has a fixed connection to the cradle by means of an elastic coiled core, to be easily removed from the vehicle, together with this cradle, and transferred to another vehicle.

What is claimed is:

1. A mobile radio facility for installation in a motor vehicle which includes as a part thereof a junction cable extending from the passenger compartment to another compartment of the vehicle and having a plug connector at each end thereof; said facility comprising a radio unit and one or more peripheral units, the radio unit being for installation in said other compartment and for plug-connection to said vehicular cable, the peripheral units being for installation in said passenger compartment;

said facility being characterized in that:
each peripheral unit has at least a pair of identical plug-in terminals providing identical connections thereto;
another junction cable is plug-connected at opposite ends thereof respectively to said vehicular cable and to a plug-in terminal of any one of said peripheral units; and
one or more additional junction cables are respectively plug-connected at opposite ends thereof to plug-in terminals of different ones of said peripheral units so as to establish a sequential order of interconnection of all of said peripheral units with said vehicular cable;
whereby said interconnection sequence can be optimized for whatever combination of peripheral equipments is comprised in said mobile radio facility.

2. A mobile radio facility as claimed in claim 1, wherein each peripheral unit has a single pair of identical plug-in terminals.

3. A mobile radio facility as claimed in claim 1, wherein one of said peripheral units is a micro-telephone and a second of said peripheral units is a control panel therefor, the micro-telephone having a telephone cradle.

4. A mobile radio facility as claimed in claim 3, wherein another of said peripheral units is a portable telephone also having a telephone cradle.

5. A mobile radio facility as claimed in claim 4, wherein the plug-in terminals of said micro-telephone are on a first printed circuit board connected to its telephone cradle, and the plug-in terminals of said portable telephone are on a second printed circuit board connected to its telephone cradle.

* * * * *